(12) United States Patent
Hertzman

(10) Patent No.: US 8,279,419 B2
(45) Date of Patent: Oct. 2, 2012

(54) GEODETIC SCANNER WITH INCREASED EFFICIENCY

(75) Inventor: Mikael Hertzman, Sollentuna (SE)

(73) Assignee: Trimble AB, Danderyd (SE)

( * ) Notice: Subject to any disclaimer, the term of this patent is extended or adjusted under 35 U.S.C. 154(b) by 114 days.

(21) Appl. No.: 12/735,760

(22) PCT Filed: Mar. 20, 2008

(86) PCT No.: PCT/EP2008/053349
§ 371 (c)(1),
(2), (4) Date: Aug. 16, 2010

(87) PCT Pub. No.: WO2009/115122
PCT Pub. Date: Sep. 24, 2009

(65) Prior Publication Data
US 2010/0315618 A1    Dec. 16, 2010

(51) Int. Cl.
*G01C 3/08* (2006.01)
(52) U.S. Cl. ............ 356/5.01; 356/3.01; 356/4.01; 356/5.1
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | |
|---|---|---|---|
| 3,710,128 A | 1/1973 | Kubisiak | |
| 5,552,893 A | 9/1996 | Akasu | |
| 6,512,993 B2 | 1/2003 | Kacyra et al. | |
| 7,480,031 B2 | 1/2009 | Mack | |
| 2002/0143506 A1 | 10/2002 | D'Aligny et al. | |
| 2006/0245717 A1 | 11/2006 | Ossig et al. | |
| 2007/0131844 A1* | 6/2007 | Shoji et al. | ...... 250/205 |
| 2008/0238760 A1 | 10/2008 | Mack | |

FOREIGN PATENT DOCUMENTS

| | | |
|---|---|---|
| EP | 1795913 | 6/2007 |
| EP | 1865336 | 12/2007 |
| WO | WO 97/40342 | 10/1997 |
| WO | WO 00/14479 | 3/2000 |
| WO | WO 2004/057269 | 7/2004 |
| WO | WO 2006/088722 | 8/2006 |

OTHER PUBLICATIONS

International Search Report.

* cited by examiner

*Primary Examiner* — Luke Ratcliffe
(74) *Attorney, Agent, or Firm* — Harness, Dickey & Pierce, P.L.C.

(57) ABSTRACT

The present invention provides a method and a geodetic scanner for determining the appearance of a target. In the method and geodetic scanner of the present invention, an initial can be performed to calculate or determine a set of optimal gain values for each one of a number of predetermined positions (151-166) at the surface of the target (150). Once gain values ($g_{151}$-$g_{166}$) have been determined for all predetermined positions, distances to each one of the predetermined positions are calculated using the gain values. The present invention is advantageous in that the measurement rate and the overall efficiency are increased.

26 Claims, 3 Drawing Sheets

GEODETIC SCANNER WITH INCREASED EFFICIENCY

FIELD OF THE INVENTION

The present invention generally relates to systems and methods for surveying and more specifically to a method and a scanner for determining the appearance of a target. The present invention relates in particular to methods and geodetic instruments for scanning a surface or volume of an object.

BACKGROUND ART

The art of surveying involves the determination of unknown positions, surfaces or volumes of objects using measurements of angles and distances. In order to make these measurements, a surveying instrument frequently comprises an electronic distance measuring device (EDM) which may be integrated in a so-called total station. A distance measuring total station combines electronic, optical and computer techniques and is furthermore provided with a computer or control unit with writable information for controlling the measurements to be performed and for storing data obtained during the measurements. Preferably, the total station calculates the position of a target in a fixed ground-based coordinate system. In, for example, WO 2004/057269 by the same applicant, such a total station is described in more detail.

Further, when performing distance measuring or surveying tasks using a distance measuring total station at a work site, it is often desirable to measure a surface or volume of an object being present on the work site. In such a work site, it may, for example, often be desirable to scan a surface of an object, for example, a wall of a building to obtain an image of the wall. For such applications, a distance measuring total station may be implemented as a geodetic scanner for determining the appearance of the object or target based on the measurements of distances to positions of interest at the surface of the target. Such a scanner may register the surface or volume of the target or even monitor changes in a scene.

In a conventional EDM, a light beam is emitted as a light pulse toward the surface of a target (or scene) and the light beam that is reflected against the surface is detected at the EDM, thereby generating a signal. Processing of the detected signal enables the determination of the distance to the surface, i.e. the distance between the EDM and the target. In a conventional geodetic scanner, the light beam is guided over each one of a number of positions of interest at the surface of the target using a beam steering function. A light pulse is emitted toward each one of the positions of interest and the light pulse that is reflected from each one of these positions is detected in order to determine the distance to each one of these positions. However, the detected signal representative of the reflected light beam (or light pulse), i.e. the return signal, may have a wide dynamic range. In other words, the strength or power of the return signal may vary significantly from one position to another. Variations of the return signal may be explained by e.g. differences of reflectivity between different positions at the surface of the target and/or large differences in the topography of the target. As a result, distances determined from a return signal having a too large or too low power are not accurate because of difficulties in handling a wide dynamic range at the measuring device (scanner). The detected signal may e.g. be saturated or subject to too much noise.

In a first alternative, the measurements for which the strength of the return signal is above a first threshold or below a second threshold may be considered as invalid and therefore deleted. However, such an alternative is not desirable since the appearance of the target object is determined from a limited number of valid measurements only, i.e. with a reduced resolution. Further, this method implies unnecessary processing of invalid measurements.

In a second alternative, a conventional method is to stop the beam steering function of the scanner at every position of interest at the surface of the target and perform a two-step measurement for each one of the positions of interest. In a first step or measurement period, a first light pulse is transmitted toward the target, and the reflected light pulse is detected and processed to calculate an appropriate gain or gain value. Typically, if the power representative of the detected light pulse is considered to be low, i.e. below a predetermined threshold, the gain is set at a value larger than 1. On the other hand, if the power representative of the detected light pulse is considered to be large, i.e. above a predetermined threshold, the gain is set at a value lower than 1. Then, in a second step or measurement period, a second light pulse is sent toward the target and the reflected light pulse is detected and amplified using the calculated gain. The amplified signal is then processed for determining the distance to the target. As a result, the distance is measured with an appropriate gain for each one of the positions of interest. However, a drawback of such a method and scanner is the limited measurement rate, and thereby rather low overall efficiency.

Thus, there is a need for providing new methods and systems that would overcome these problems.

SUMMARY OF THE INVENTION

An object of the present invention is to wholly or partly overcome the above disadvantages and drawbacks of the prior art and to provide a more efficient alternative to the above techniques and prior art.

More specifically, it is an object of the present invention to provide a method and a geodetic scanner with increased measurement rate, and thereby increased efficiency, when determining the appearance of a target.

Another object of the present invention is to provide a method and a geodetic scanner for reducing the demand on the deflection motors used for rotating the scanner.

A further object of the present invention is to provide a method and a geodetic scanner that reduce power consumption.

These and other objects of the present invention are achieved by means of a method, a geodetic scanner and a computer program product having the features defined in the independent claims. Preferable embodiments of the invention are characterized by the dependent claims.

Hence, according to a first aspect of the present invention, a method is provided, comprising the steps of emitting an electromagnetic radiation beam toward each one of a number of predetermined positions at the target. The method further comprises, for each one of the predetermined positions, the steps of measuring the signal strength of the electromagnetic radiation beam that is reflected against the target and the step of determining a gain value based on the measured signal strength. Once gain values have been determined for the predetermined positions, a step of measuring the distances to each one of the predetermined positions using the gain values is performed.

According to a second aspect of the present invention, a geodetic scanner is provided, comprising a radiation source for emitting an electromagnetic radiation beam toward the target, a scanning device for guiding the radiation at predetermined positions over the target and a receiver for receiving the radiation that is reflected by the target. The geodetic scanner further comprises a processor for measuring the signal strength of the reflected radiation and calculating, based on the measured signal strength, a gain value associated with a predetermined position for each one of the predetermined positions. The scanner further comprises a memory for recording the calculated gain value of each one of the predetermined positions and an amplifier for amplifying, using the calculated gain value, the signal strength of the reflected radiation beam when measuring the distance to each one of the predetermined positions. The geodetic scanner of the present invention is configured to scan the target in order to determine gain values and, once the gain values have been determined for the predetermined positions, scan the target in order to measure distances.

According to a third aspect of the present invention, there is provided a computer program product, loadable into an internal memory of a geodetic scanner according to the second aspect of the present invention, comprising software code portions for causing a control unit or processor of the scanner to perform steps in accordance with the first aspect of the present invention.

The present invention is based on the idea of scanning the surface of a target to determine a set of optimal gain values for a number of predetermined positions at the surface of the target and, once the gain values have been determined for all predetermined positions, scanning the surface to measure the distances to each one of the positions of interest using the determined gain values.

With the present invention, while continuously moving the scanner, a set of optimal gain values is determined for each one of a number of positions at the surface of a target by acquiring a corresponding set of signal amplitudes (or strengths or powers), and distances to these positions are measured using the determined set of optimal gain values when scanning back to the same positions.

The present invention achieves a number of advantages. For instance, the scanner and method of the present invention are advantageous in that the beam is continuously kept in motion. As compared with the two-step measurement method for instance, the overall measurement rate is increased.

Further, as the beam is continuously kept in motion in the present invention, the exposure time for a person's eye per time interval is reduced. Generally, the amount of light an eye can tolerate depends on the intensity, the wavelength and the duration of irradiation. With respect to laser regulations for eye safety, the energy to which an eye may be exposed under a certain period of time must not exceed a predefined value. For a similar density of positions at a surface of an object, for a scanner according to the present invention as compared to a conventional scanner using a two-step measurement method, an eye may be exposed to the same amount of energy but the exposure time is spread over a longer period of time with the present invention. Indeed, distance measurements are performed once all gain values have been determined instead of after every determination of a gain value as in a two-step measurement method. In other words, a longer period of time has lapsed between the exposure for determination of a gain value at a particular position and the exposure for distance measurement at the same position. As a result, with the present invention, the average power that is received by an eye is reduced.

Further, while complying with the above mentioned laser regulations, the output power of the laser could be increased since the exposure time for a person's eye per time interval is reduced. An increase of the laser output power would be advantageous since it would increase the signal to noise ratio of the signal used to calculate the distance, thereby providing more accurate measurements.

Further, the present invention is advantageous in that it reduces power consumption. Referring again to prior art scanners, high power consumption is required each time the scanner needs to move from one position to another because of the required acceleration. In a worst-case scenario, the acceleration required for rotating a conventional scanner from one position to an another may be so high that the deflection motor may burn because of a too high applied power. In the present invention, the scanner is always in motion during measurements.

According to an embodiment, the distance from the scanner may be measured for at least one intermediate position located between at least two predetermined positions using a gain value estimated from the two determined gain values associated with the two predetermined positions. This embodiment is advantageous since the initial scan is performed to calculate gain values for only a sub-set of the positions to which distances are measured. As a result, the measurement rate and the overall efficiency are increased.

In a particular embodiment, the two predetermined positions may be the two closest positions to an intermediate position. Alternatively, the two predetermined positions may initially be two adjacent positions. Further, any number of predetermined positions may be used to estimate the gain value of an intermediate position. This number does not have to be limited to two.

According to yet another embodiment, the distance to at least one intermediate position located between at least two predetermined positions is measured when the signal strengths or the distances associated with these two predetermined positions differ by a factor larger than a predefined threshold. A large difference between the measured signal strengths or distances of two neighbouring predetermined positions may for instance indicate a region with sharp transitions. If such a region is detected, it is advantageous to measure distances to additional intermediate positions covering this region. In the case of a planar wall without any particular relief, only a limited number of measurements would be performed. However, if a region with sharp transitions is detected on the wall, the number of measurements in this region is increased. The number of intermediate positions would preferably depend on the value of said factor, i.e. how sharp the transition is. The present embodiment is advantageous in that distance measurements are only performed for useful positions at the surface of the target.

Alternatively, it may also be possible to intentionally perform an initial sparse scan and calculate gain values for only some of the positions of interest. Distance measurements for the remaining positions of interest are then performed using estimated gain values. This procedure is particularly advantageous in that the overall measurement rate may significantly be increased. Further, referring to laser regulations, the present embodiment is advantageous in that the first scan is sparsely performed; thus, the average power that may be received by an eye is decreased.

According to one embodiment, the step of determining a gain value during the initial scan includes comparing the detected signal strength of the reflected radiation beam with a predefined value. A proportionality relation may be established between the detected signal strength and the desired signal strength or predefined value, thereby calculating the gain value. In a particular embodiment, the gain value may correspond to a factor by which the measured signal strength is multiplied to meet the predefined value.

Although not required for implementing the present invention, the predetermined positions may preferably form a virtual matrix of measuring points or positions covering at least a region of the surface of the target. Such a configuration is advantageous since it simplifies the scanning procedure. The positions may be arranged as a matrix of lines and columns along e.g. a horizontal and vertical direction, respectively, which renders the scanner and method of the present invention even more efficient.

According to an embodiment, the step of measuring the distance is based on time of flight measurements. Alternatively, according to another embodiment, the distance may be measured based on the phase modulation measurement method.

Further objectives of, features of, and advantages with, the present invention will become apparent when studying the following detailed disclosure, the drawings and the appended claims. Those skilled in the art realize that different features of the present invention can be combined to create embodiments other than those described in the following.

In the present application, a position is defined as a location or point on the surface of a target, i.e. a location or point at the surface of an object for which distance measurement may be desired.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, in which.

All the figures are schematic, not necessarily to scale, and generally only show parts which are necessary in order to elucidate the invention, wherein other parts may be omitted or merely suggested.

DESCRIPTION OF PREFERRED
EMBODIMENTS

Figure 1:
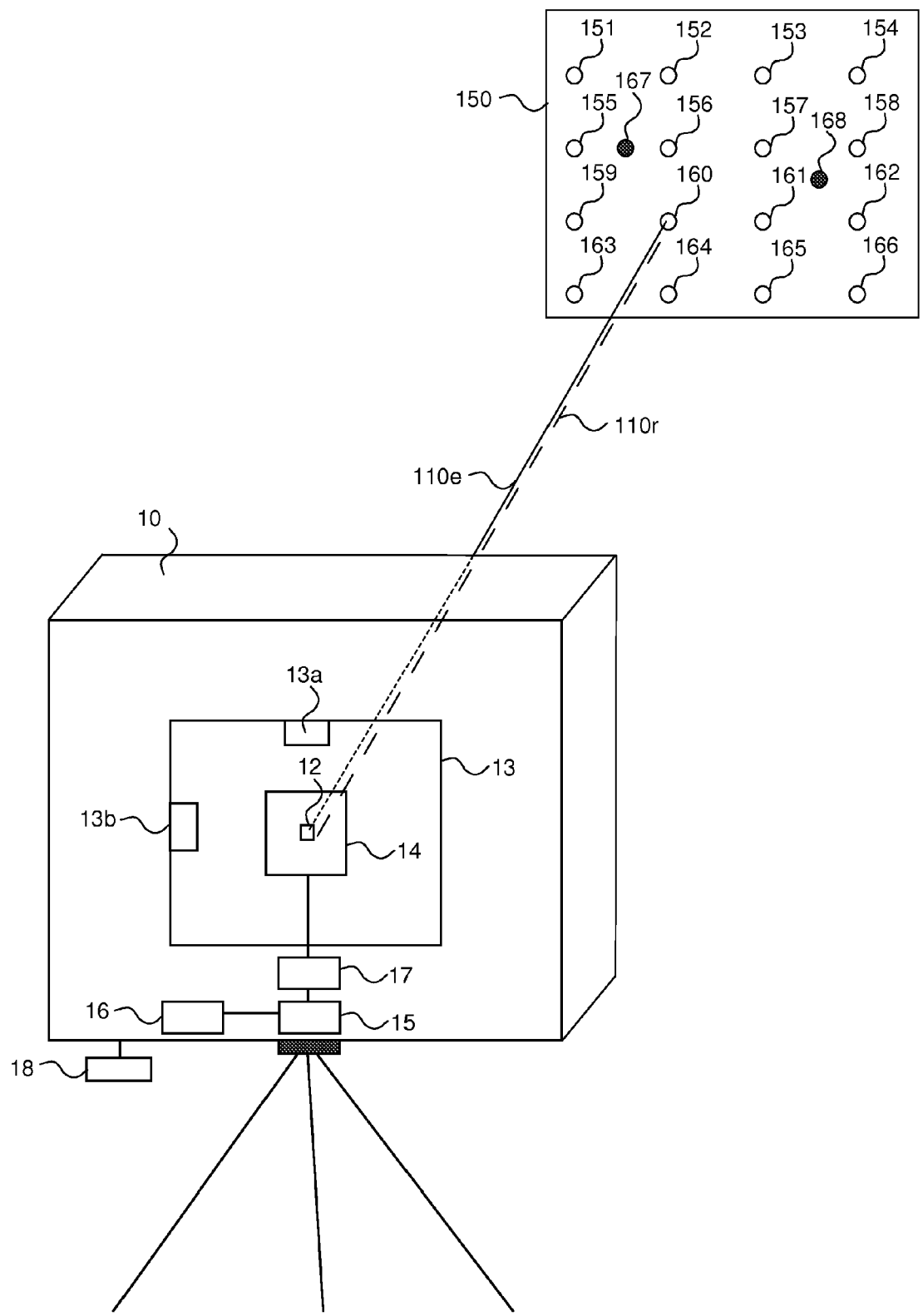
FIG. 1 shows a schematic view of a scanning procedure and a geodetic scanner according to an embodiment of the present invention.

With reference to FIG. 1, a geodetic scanner 10 implementing a scanning procedure according to an embodiment of the present invention is described.

In the present embodiment, the geodetic scanner 10 determines the appearance of a target 150, for example a wall, by scanning over a number of predetermined positions 151-166.

The number of predetermined positions to be measured may be manually selected by a user, e.g. by entering data via a keyboard 18 of the geodetic scanner 10. For example, the user may select a number of measurements to be performed per angle unit, e.g. one measurement every grad. As another example, the geodetic scanner 10 may comprise a camera (not shown), such as a CCD or a CMOS, for displaying an image of the target to the user who may then select a number of points corresponding to a number of positions at the surface of the target. Alternatively, the user may select a region of interest in the image and enter a desired number of positions. The distribution of the predetermined positions may then automatically be computed by a processor 15 of the geodetic scanner 10.

The geodetic scanner 10 comprises a radiation source 12 for emitting an electromagnetic radiation beam 110e toward the target 150. During the scanning procedure, a light pulse is emitted toward each one of the predetermined positions 151-166, such as shown for position 160 in FIG. 1.

For each one of the predetermined positions 151-166, the electromagnetic radiation beam (or light pulse) 110r that is reflected against the target 150 (such as against position 160 in FIG. 1) is detected by a detector 14 of the geodetic scanner 10. A signal representative of the reflected light beam 110r is generated by the detector 14 and sent from the detector 14 to the processor 15 which measures the strength of the detected signal and calculates a gain value $g_{160}$ based on the measured signal strength.

The strength of the detected signal representative of the reflected light pulse for a predetermined position depends on the reflectivity property at the predetermined position and the distance between the scanner and the predetermined position. For example, a light pulse that is reflected against a mirror-like surface oriented perpendicular to the incoming light ray would give a large signal strength. However, if the mirror like surface is not perpendicular to the incoming ray, the signal strength will be lower. Generally, because of these structural aspects, the surfaces or objects corresponding to some of the predetermined positions appear to be brighter than those at other positions. Consequently, the strength of the detected signal may vary significantly between two different predetermined positions at the surface of the target.

The optimal gain value $g_{160}$ may be calculated by comparing the measured signal strength of the reflected radiation beam (or light pulse) with a predefined value. In a particular embodiment, the gain value may correspond to a factor by which the measured signal strength is multiplied to meet or equal the predefined value. Typically, if the signal strength associated with the reflected radiation beam is below the predefined value, i.e. considered low, a gain value larger than 1 is determined and associated with the predetermined position. On the other hand, if the signal strength associated with the reflected radiation beam is above the predefined value, i.e. considered great, a gain value lower than 1 is determined and associated with the predetermined position.

The calculated gain value $g_{160}$ may then be stored in a memory 16 of the geodetic scanner 10.

Once the gain value has been calculated for the predetermined position 160, the scanner is rotated so that it aims at a next predetermined position, for instance position 161. A light pulse is sent in direction of the next predetermined position 161, and the same procedure as described above is performed to calculate the optimal gain value $g_{161}$ associated with the predetermined position 161. It is noted that the scanner may be rotated so that the radiation source aims at position 164 rather than position 161 depending on the configuration of the scanner for scanning the target (scan performed along a horizontal or vertical direction).

It is noted that the period of time between emission of a light pulse from the scanner and detection of the reflected light pulse at the scanner is negligible. Generally, it is considered that the propagation speed of the light pulse is in the order of 3 ns/m. For a target placed at a distance of one meter from the scanner, the measurement would then take about 6 ns. Thus, it is not required to halt the scanner at each one of the positions while scanning. The rotation of the scanner according to the present invention is continuous.

Once gain values $g_{151}$-$g_{166}$ have been calculated for all predetermined positions 151-166, the distance to each one of the predetermined positions is measured using the calculated gain values.

The scanner is rotated so that it aims at a predetermined position, for instance position 151. A light pulse is emitted toward the predetermined position 151 of the target and the light pulse that is reflected against position 151 is received by the scanner. The received light pulse is processed using the gain value $g_{151}$ associated with the position 151 and the distance between the scanner and the position 151 is calculated.

According to one embodiment, the step of measuring the distance is based on time of flight measurements (or pulse measurements), i.e. measurement of the time of flight of a laser pulse from the measurement device, i.e. the scanner, to a target and back again to the measurement device.

Alternatively, according to another embodiment, the distance may be measured based on a phase modulation measurement method. In this method, emission of light pulses from the radiation source of the scanner to the target is controlled by base signals generated e.g. by processor 15. A photodetector 14 detects the reflected light pulses and transmits electric signals representative of the detected light pulses to the processor 15 which calculate distances based on the phase difference between the electric signals and the base signals.

It is noted that the power of the radiation source 12 is always kept constant, which is important with regard to laser regulations. The calculated gain values are used to control, via an amplifier 17, the amplification of the detected signal representative of the reflected light pulse. The gain values are preferably used to electronically control the strength of the detected signal via the amplifier 17. However, it may also be possible to optically control the strength of the reflected light pulse using the calculated gain values, but this would require rather advanced and expensive optical components.

Still referring to FIG. 1, structural elements of the geodetic scanner 10 are described in more details in the following.

The geodetic scanner for determining the appearance of a target comprises a radiation source 12 for emitting an electromagnetic radiation beam toward the target. The radiation source 12 may emit a laser beam at a specific wavelength or specific range of wavelengths. In a conventional geodetic scanner, the radiation source emits traditionally at 532 nm. Today's radiation source of geodetic scanners emit in the range of red or infrared light, i.e. 850 nm and above. Preferably, the radiation source may emit at 1500 nm which is a rather safe wavelength for the eye since such radiation is absorbed in the eye's lens rather than in the eye retina. However, the laser source of a geodetic scanner implemented in accordance with the present invention is not limited to a specific wavelength.

Further, the geodetic scanner 10 comprises a scanning device 13 for guiding the radiation over the predetermined positions 151-166 of the target. The scanning device 13 may comprise a horizontal deflection unit 13a and a vertical deflection unit 13b in order to scan the target along a horizontal direction or a vertical direction, respectively. Each of these units comprises a deflection motor. As mentioned earlier, requirements on the deflection motor are mitigated in the present invention.

The geodetic scanner 10 further comprises a receiver 14 for receiving the radiation beam or light pulse that is reflected by the target 150. The receiver 14 may be a light sensitive detector adapted to detect a laser beam. For instance, the receiver 14 may be a semiconductor-based photodetector such as an avalanche photodiode (APD) or a pin diode. The photodetector is preferably sensitive to the wavelength at which the radiation source emits.

Further, the geodetic scanner 10 comprises a processor 15 for measuring the signal strength of the reflected light pulse and calculating, based on the measured signal strength, a gain value associated with a predetermined position. In a particular embodiment, the processor 15 may also comprise logic and software for calculating distances such as in a conventional EDM. In an alternative embodiment, the geodetic scanner may comprise an EDM which operates using the gain values calculated by the processor 15.

The geodetic scanner may comprise a memory 16 for recording the calculated gain values associated with each one of the predetermined positions. Further, the geodetic scanner comprises an amplifier 17 for amplifying, using the calculated gain values, the signal strengths of the reflected light pulses when measuring the distances to each one of the predetermined positions.

According to an embodiment, the amplifier is a non-linear (logarithmic) amplifier which is advantageous since it provides a high dynamical range.

As mentioned above, the geodetic scanner 10 is configured to perform an initial scan of the target in order to determine gain values associated with predetermined positions at the surface of the target and, once the gain values have been determined for all predetermined positions, scan the target in order to measure distances to each one of the predetermined positions. In an embodiment, the processor 15 may also be implemented to control the scanning device 13. Alternatively, the geodetic scanner 10 may comprise a separate control unit adapted to specifically control the scanning device 13. According to another alternative, such functions may be directly implemented in the scanning device 13.

Figure 2:
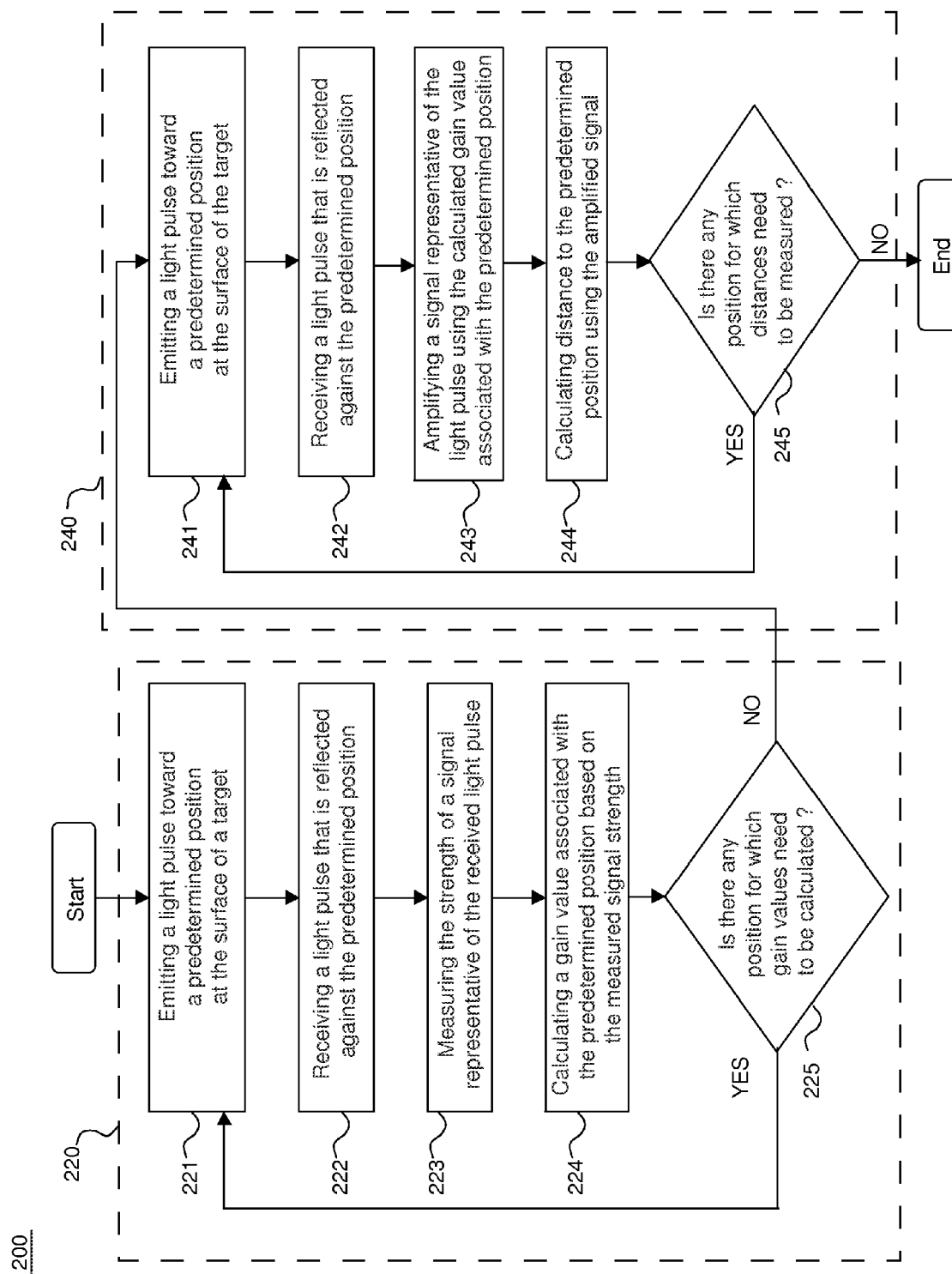
FIG. 2 shows a flow diagram of a scanning method according to an embodiment of the present invention.

With reference to FIG. 2, a scanning method 200 in accordance with an embodiment of the present invention will be described.

The method 200 comprises a process 220 for calculating a set of gain values associated with a number of predetermined positions at the surface of a target and a process 240 for calculating distances from the predetermined positions to the scanner for each one of the predetermined positions using the gain values calculated in process 220.

In the process 220 of calculating a set of optimal gain values, the geodetic scanner emits 221 a light pulse towards one of the predetermined positions and receives 222 the light pulse that is reflected against the predetermined position. The strength of a signal representative of the received light pulse is measured 223 and a gain value associated with the predetermined position is calculated 224 based on the measured signal strength. Then, at step 225, it is determined whether there is any other position at the surface of the target for which gain values need to be calculated. If there is at least one remaining position for which a gain value needs to be calculated, the method returns to step 221 and steps 222-225 are repeated for the remaining position. The process 220 is repeated until gain values have been determined for all predetermined positions.

Once gain values have been determined for all predetermined positions, distances to each one of the predetermined positions are measured in process 240 using the gain values calculated in process 220. The geodetic scanner emits 241 a light pulse towards one of the predetermined positions and receives 242 the light pulse that is reflected against the predetermined position. A signal representative of the received light pulse is amplified 243 using the calculated gain value associated with the predetermined position. The amplified signal is then processed to calculate 244 the distance to the predetermined position. Then, at step 245, it is determined whether there is any other position at the surface of the target for which distance needs to be measured. If there is at least one remaining position for which distance needs to be measured, the process returns to step 241 and steps 242-244 are repeated. The process 240 is repeated until distances have been calculated for all predetermined positions.

As a result, distances between predetermined positions at the surface of the target and the scanner have been measured. These measurements can then be processed to determine the appearance (surface or volume) of the scanned object.

Referring again to FIG. 1, another embodiment of the present invention will be described in the following.

In the present embodiment, the distance from the scanner is also measured for at least one intermediate position 167 located between two predetermined positions 155 and 156 using a gain value $g_{167}$ estimated from the two determined gain values $g_{155}$ and $g_{156}$ associated with the two predetermined positions 155 and 156, respectively. This embodiment is advantageous since the gain value associated with the predetermined position 167 does not have to be calculated during the initial scan. Thus, the measurement rate and the overall efficiency of the scanner are increased. For instance, if optimal gain values are calculated every tenth position in the initial scan, i.e. for only one of ten positions for which distances will be calculated, the overall efficiency is 90% and the measurement rate is considerably increased. If gain values were calculated for every position to which distances were calculated, the overall efficiency would be 50%.

In a particular embodiment, two predetermined positions may be the two closest points to an intermediate position. Alternatively, the two predetermined positions may initially be two adjacent positions. Further, any number of positions may be used to estimate the gain value of an intermediate position and does not have to be limited to two positions. For example, referring to FIG. 1, the gain value $g_{168}$ associated with the intermediate position 168 may be estimated from the gain values $g_{157}$, $g_{158}$, $g_{161}$, and $g_{162}$ associated with the positions 157, 158, 161 and 162, respectively.

According to an embodiment, the gain value associated with an intermediate position may be estimated by averaging the gain values calculated for the neighbouring predetermined positions.

Figure 3:
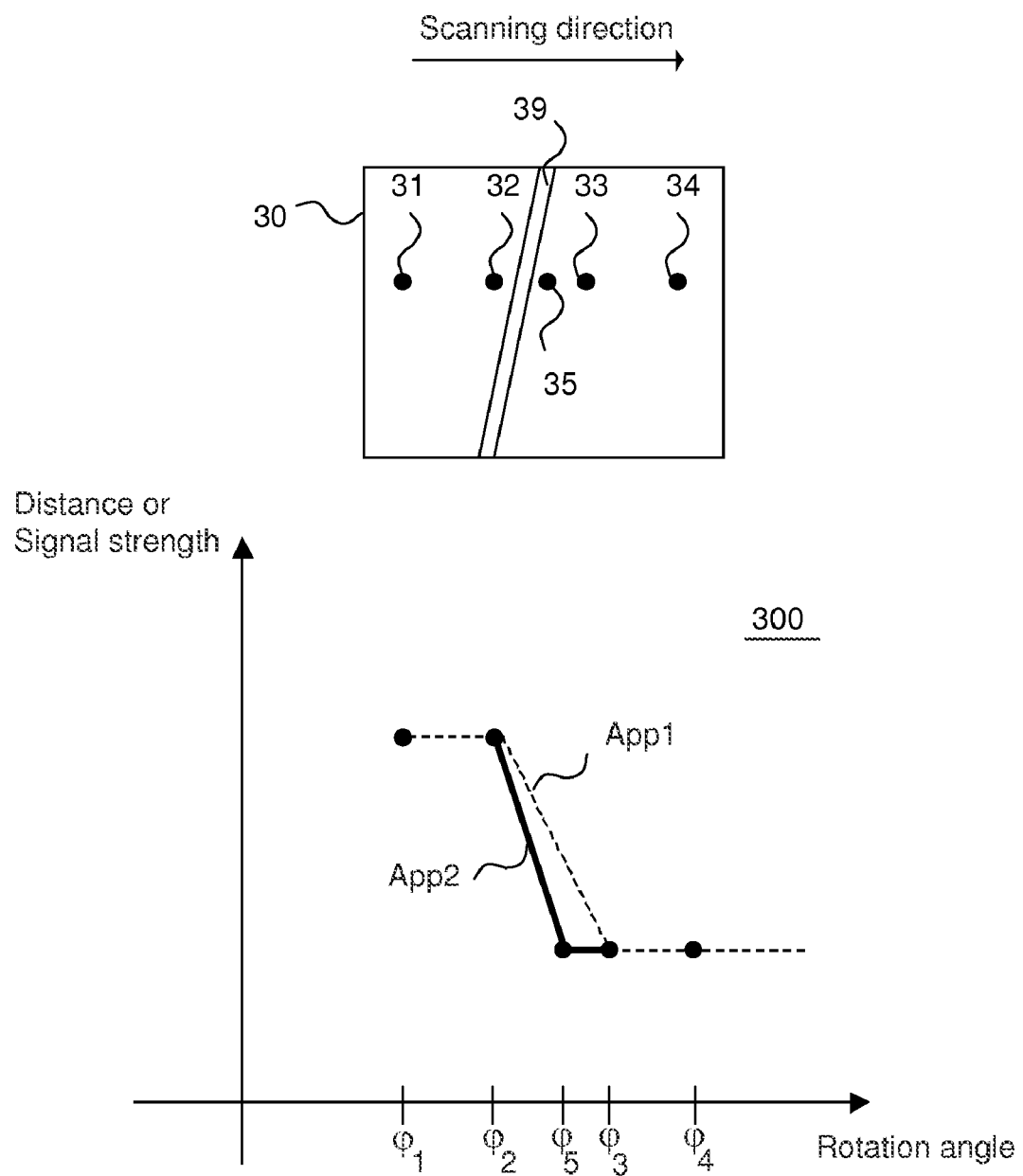
FIG. 3 shows a graph illustrating the profile obtained after scanning a target object having a sharp transition in accordance with an embodiment of the present invention.

With reference to FIG. 3, another embodiment of the present invention will be described.

In this embodiment, the distance to at least one intermediate position located between two predetermined positions is measured when the signal strengths or the distances associated with these two predetermined positions differ by a factor larger than a predefined threshold. As an example, if the target object or scene is a fence in front of a house wall (with a great distance between the fence and the house wall), the strength of the signal representative of a light pulse reflected against the fence may significantly differ from the strength of the signal representative of a light pulse reflected against the house wall. As another example, if the target object is an hanging fishing net, there may be great differences in measured signal strengths or measured distances depending on whether the light pulse is reflected against a thread of the fishing net or not.

FIG. 3 shows a graph 300 illustrating the profile obtained after scanning a target object 30 having a sharp transition 39. The graph illustrates the signal strength or distance as a function of the rotation angle $\phi$ of the scanner. In this example, the strengths of the reflected light pulses are measured for four positions 31, 32, 33 and 34 at the surface of the target 30. These positions correspond to four rotation angles ($\phi_1$, $\phi_2$, $\phi_3$ and $\phi_4$, respectively, of the scanner. The resulting signal strengths may then be analysed to identify whether there is any large variation between two neighbouring positions. Similarly, the measured distances may be processed to reconstitute or determine the profile of the target object along the scanning direction. A first appearance profile app1 may be determined, as illustrated by the dotted line in FIG. 3.

In the present embodiment, the geodetic scanner detects that the difference between the signal strength measured for positions 32 and 33 is great, i.e. above a predefined threshold. As a result, during the step of measuring distances, the distance to an intermediate position 35 located between the predetermined positions 32 and 33 is also measured.

According to an embodiment, a gain value $g_{35}$ associated with the intermediate position 35 may be calculated before measuring the distance to the intermediate position 35. However, it is also possible to estimate the gain value $g_{35}$ associated with the intermediate position 35 based on the gain values $g_{32}$ and $g_{33}$ already calculated for the neighbouring positions 32 and 33.

As illustrated in the graph of FIG. 3 by the continuous line, the determination of the distance to the intermediate position 35 enables a more accurate determination of the profile of the target object 30 in the region located between positions 32 and 33. The determination of the appearance app2 of the target object 30 could be further improved if distances were measured for more than one intermediate position between positions 32 and 33.

The number of intermediate positions preferably depends on the value of the factor representing the difference between the measured signal strengths of positions 32 and 33. This embodiment is advantageous in that measurements are only performed for useful positions at the surface of the target.

The present invention is applicable for several types of geodetic scanners, laser radars, electronic measuring devices, measuring devices and/or total stations equipped with a scanning device or scanning function.

Although the invention above has been described in connection with preferred embodiments of the invention, it will be evident for a person skilled in the art that several modifications are conceivable without departing from the scope of the invention as defined by the following claims.

The invention claimed is:

1. A method implemented in a geodetic scanner, said method comprising:
   emitting an electromagnetic radiation beam toward each one of a number of selected positions at a target;
   measuring, for each one of the selected positions, the signal strength of the electromagnetic radiation beam that is reflected against the target;
   determining, for each one of the selected positions, a gain value by comparing the measured signal strength of the reflected radiation beam with a predefined value;
   measuring, once gain values have been determined for the selected positions, the distances to each one of the selected positions using the gain values; and
   determining the appearance of the target based on the measured distances.

2. The method as defined in claim 1, wherein measuring signal strength includes detecting an electromagnetic radiation beam that is reflected by the surface; and measuring the signal strength associated with the detected radiation beam.

3. The method as defined in claim 1, wherein the electromagnetic radiation beam is a laser beam.

4. The method as defined in claim 1, wherein the electromagnetic radiation beam is directed toward the selected positions by scanning the surface along a horizontal direction or a vertical direction.

5. The method as defined in claim 1, wherein measuring the distance is based on at least one of a time of flight measurement method and a phase modulation measurement method.

6. The method as defined in claim 1, wherein said selected positions form a matrix of measurement points covering at least a region of the target.

7. The method as defined in claim 6, wherein the target is scanned by moving the radiation beam row by row along a horizontal direction of the matrix.

8. The method as defined in claim 6, wherein the target is scanned by moving the radiation beam column by column along a vertical direction of the matrix.

9. The method as defined in claim 1, wherein measuring the distances includes measuring the distance to at least one intermediate position located between at least two selected positions using a gain value estimated from the two determined gain values associated with the two selected positions.

10. The method as defined in claim 9, wherein the two selected positions are adjacent positions.

11. The method as defined in claim 9, wherein measuring the distance to at least one intermediate position located between at least two selected positions is performed when the signal strengths associated with these two selected positions differ by a factor greater than a predefined threshold.

12. The method as defined in claim 9, wherein measuring the distance to at least one intermediate position located between at least two selected positions is performed when the measured distances for these two selected positions differ by a factor greater than a predefined threshold.

13. The method as defined in claim 11, wherein the number of intermediate positions depends on the value of the factor.

14. A geodetic scanner comprising:
- a radiation source for emitting an electromagnetic radiation beam toward a target;
- a scanning device for guiding the radiation at selected positions over the target;
- a receiver for receiving the radiation that is reflected by the target;
- a processor for measuring the signal strength of the reflected radiation and calculating, by comparing the measured signal strength with a predefined value, a gain value associated with a selected position;
- a memory for recording the calculated gain value of each one of the selected positions; and
- an amplifier for amplifying, using the calculated gain value, the signal strength of the reflected radiation beam when measuring the distance to each one of the selected positions;

wherein the scanner is configured to scan the target in order to determine gain values and scan, once the gain values have been determined for the selected positions, the target in order to measure distances, said geodetic scanner being configured to determine the appearance of the target based on the measured distances.

15. The scanner as defined in claim 14, wherein said scanning device comprises a horizontal deflection unit and a vertical deflection unit in order to scan the target along a horizontal direction and a vertical direction, respectively.

16. The scanner as defined in claim 14, wherein said receiver is a light sensitive detector adapted to detect a laser beam.

17. The scanner as defined in claim 14, further comprising an electronic distance measuring device for measuring the distances.

18. The scanner as defined in claim 14, wherein said selected positions form a matrix of measurements points covering at least a region of the target.

19. The scanner as defined in claim 18, wherein said scanning device is configured to move the electromagnetic radiation beam row by row along a horizontal direction of the matrix.

20. The scanner as defined in claim 18, wherein said scanning device is configured to move the beam column by column along a vertical direction of the matrix.

21. The scanner as defined in claim 14, wherein said processor is configured to estimate a gain value for at least one intermediate position located between at least two selected positions based on the two determined gain values associated with the two selected positions and wherein the scanner is configured to measure the distance to said at least one intermediate position using the estimated gain value.

22. The scanner as defined in claim 21, wherein the two selected positions are adjacent positions.

23. The scanner as defined in claim 21, wherein said scanner is configured to measure the distance to at least one intermediate position located between at least two selected positions when the signal strengths associated with these two selected positions differ by a factor greater than a predefined threshold.

24. The scanner as defined in claim 21, wherein said scanner is configured to measure the distance to at least one intermediate position located between at least two selected positions when the measured distances for these two selected positions differ by a factor greater than a predefined threshold.

25. The scanner as defined in claim 23, wherein the number of intermediate positions depends on the value of the factor.

26. A computer program product, loadable into an internal memory of a geodetic scanner, comprising software code portions for causing a control unit of said geodetic scanner to perform the method of claims 1.

* * * * *